O. MILLER.
CLUTCH.
APPLICATION FILED JAN. 9, 1914.
1,132,958. Patented Mar. 23, 1915.
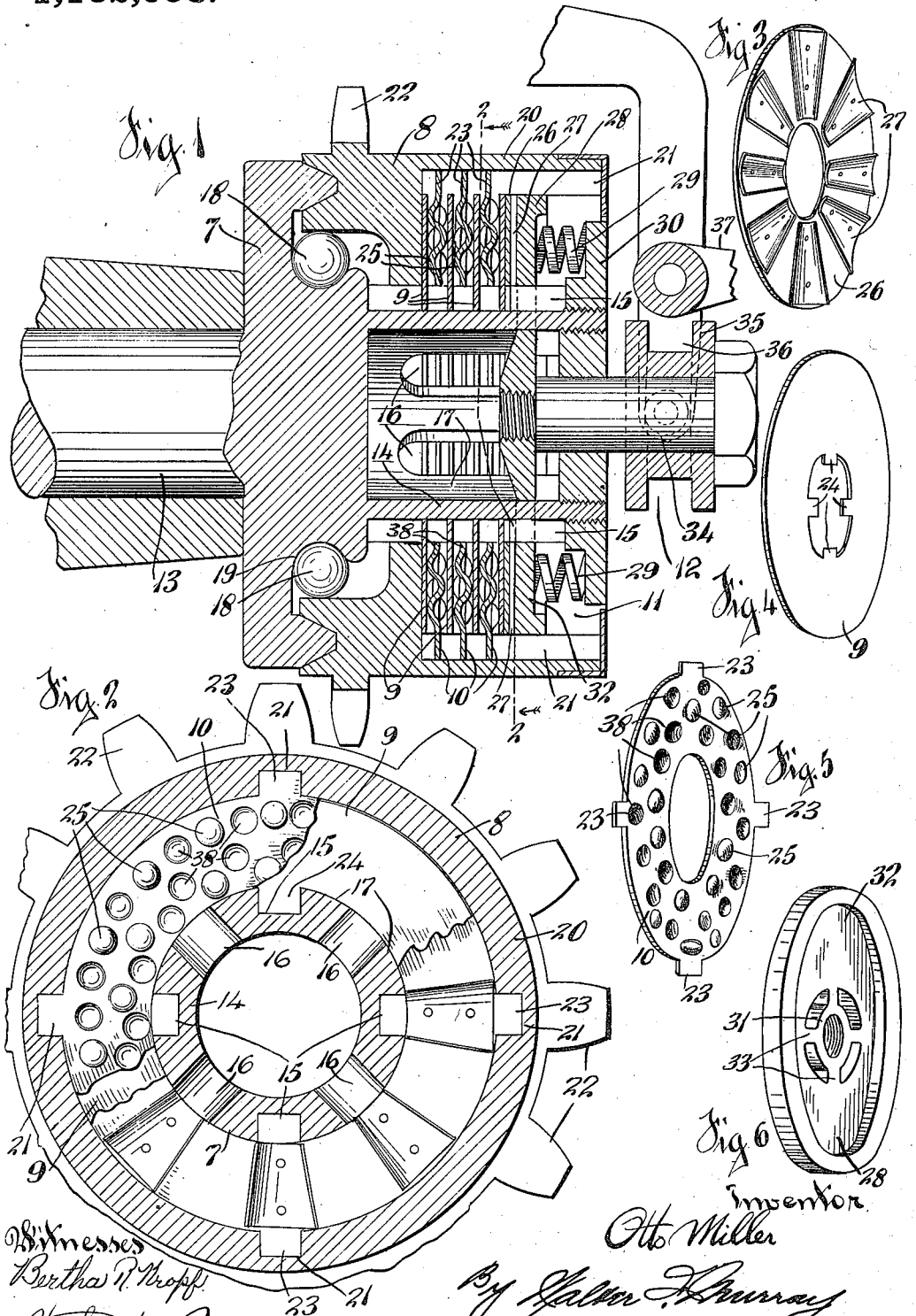

UNITED STATES PATENT OFFICE.

OTTO MILLER, OF CINCINNATI, OHIO.

CLUTCH.

1,132,958.      Specification of Letters Patent.      Patented Mar. 23, 1915.

Application filed January 9, 1914. Serial No. 811,128.

*To all whom it may concern:*

Be it known that I, OTTO MILLER, a citizen of the United States of America, and resident of Cincinnati, county of Hamilton, and State of Ohio, have invented certain new and useful Improvements in Clutches, of which the following is a specification.

This invention relates to improvements in clutches and particularly to that class commonly known as multiple disk clutches, in which one series of disks are mounted to rotate with the driving member to form the power transmitting disks while the other series are mounted to rotate with the driven member to coöperate with the power transmitting disks in communicating motion to the driven member.

An object of my invention is to produce a clutch, which is capable of more minute adjustment and which will consequently operate more smoothly than other clutches known to me.

Another object of my invention is to produce a clutch, in which improved means are employed for obtaining more efficient lubrication between adjacent friction disks.

These and other objects are attained in the clutch described in the following specification, and illustrated in the accompanying drawings, in which, Figure 1 is a sectional view of a clutch embodying my invention. Fig. 2 is a transverse sectional view taken on the line 2—2 of Fig. 1, with certain parts broken away for purposes of illustration. Fig. 3 is a perspective view of an auxiliary spring disk forming part of my improved clutch construction. Fig. 4 is a perspective view of a power transmitting disk forming a detail of the clutch. Fig. 5 is a perspective view of an improved friction disk forming part of my improved clutch construction. Fig. 6 is a perspective view of a detail of my invention.

The clutch illustrated comprises a driving member 7, a driven member 8, friction disks 9 and 10, for communicating motion from the driving to the driven member, means 11 for causing the disks to frictionally engage each other and manually operated means 12 for causing the engaging means 11 to release the frictional engagement of the disks with each other.

The driving member 7 is mounted on the power shaft 13 and has an outwardly extending hollow cylindrical portion 14, in the outer surface of which key-ways 15 are formed. Between these keyways, slots 16 are provided, which extend from the outer end to the inner end of portion 14, and divide it into sections 17.

The driven member 8 is mounted to rotate on ball bearings 18 running in a ball race 19 formed on the driving member 7 and is provided with an outwardly extending shell-like portion 20.

In the inner surface of the shell 20, keyways 21 are formed, while on its outer surface, driving means, such as the sprocket teeth 22 are located.

The friction disks 10 are provided with lugs or keys 23, which engage the keyways 21 of the driven member 8 and the alternate disks 9 are provided with lugs or keys 24, which engage the keyways 15 of the driving member 7. The series of driving disks 9 are of plain flat metal, as shown in Fig. 4, while the driven disks 10, shown in Fig. 5, are roughened or formed with a series of projections 25, which extend from each side thereof, forming a series of oppositely located recesses 38. These projections hold the adjacent smooth disks 9 away from the body of the disks 10, so that they contact only the tops of the projections.

Contacting the outermost smooth disk 9 is an auxiliary spring-carrying disk 26, which is provided with a series of radially extending flat springs 27, curved outwardly from the disk, as shown in Fig. 3. Against these springs rests a thick disk 28, which is held into engagement with the auxiliary spring disk by a series of coil springs 29. At their outer ends, these springs contact a plate 30, screwed to the other end of the cylindrical portion 14 of the driving member 7. Disk 28 has a central threaded portion 31, which is connected with the annular ring-like part 32 by webs 33. These webs engage the slots 16, thus locking disk 28 in driving engagement with member 7, but permitting reciprocatory movement thereof in the slots. For the purpose of effecting the engagement and disengagement of the friction disks, the disk 28 is provided with a short stub shaft 34, which extends outside the clutch and has a grooved collar 35 secured to it. A yoke 36 engages the groove in this collar, and by operating a handle 37 secured to this yoke, the disk 28 is withdrawn to release the friction disks from the pressure of the springs 29.

In operation: We will assume the clutch disks to be frictionally disengaged from one another by the withdrawal of disk 28 from contact with them. The coil springs 29 are held under compression in this position of disk 28, while flat springs 27 on disk 26 are permitted to assume their normal or curved form, as shown in Fig. 3, and disks 9 are permitted to revolve with the driving member 7, while disks 10, mounted on the driven member 8, remain stationary. When it is desired to frictionally engage the clutch members, the yoke 36 is moved to permit the disk 28 to move gradually inward under the pressure of springs 29. As the disk moves in, the auxiliary spring disk 26 is forced against the outermost of the smooth disk series 9. All of the friction disks of both the series 9 and 10 are now caused to lightly engage one another, permitting the driven member 8 to gradually take up the driving power of member 7. As the disk 28 is permitted to move farther, the springs 27 on the disk 26 are placed under greater tension, thus causing the tops of the projections 25 on the roughened disks 10 to engage the smooth surfaces of the disks 9 with greater force, consequently increasing the friction between adjacent disks and causing the driven member 8 to receive more of the driving power of member 7. As springs 29 are permitted to exert more pressure upon disk 26, through the moving of disk 28, springs 27 on disk 26 become entirely flattened and exert their entire compressive force on the friction disks. Relative movement between the two series of disks 9 and 10, and the driving and driven members, is still permissible, however, under some strains, which may be imposed on the driven member 8 and these members are not locked together for ordinary loads, until the disk 28 is finally permitted to engage the disks with the entire force of springs 29.

In ordinary multiple disk clutch construction, the disks of both driving and driven series are alike. In such a construction lubrication of the surfaces of adjacent disks is difficult, because when the disks are pressed together, lubricating material is squeezed out from between them, and when the disks are allowed to slip, the lubricating material is used up, until the surfaces of the disks become dry. When the friction disks are dry, the slightest engaging movement of the clutch members, causes the friction disks to "grab" or lock in frictional engagement with one another and to thereby subject the parts of the mechanism to undesirable shocks. In order to overcome these objections, I have provided the one series of disks 10 with the hemispherical projections 25. I have found that the frictional surface afforded by the tops of these projections, is ample to effect a locking engagement of the two series of disks, while the space between adjacent disks and the recesses created by the formation of the projections enables the lubricant to enter between them and to effectively lubricate the disk surfaces.

In providing the auxiliary spring disk, the clutch is caused to operate with increased smoothness, for the reason that greater range of adjustment as to the degree of friction between adjacent disks is available. Assuming the range of action of springs 27 on disk 26 to be from 0 to 25 pounds, and the range of action of springs 29 to be from 25 to 100 pounds, it may readily be seen that for any adjustment of the disk 28 from 0 to 25 pounds, the springs of the auxiliary disk will be brought into action, these springs becoming entirely flattened at 25 pounds pressure. For any adjustment from 25 to 100 pounds, springs 29 will be brought into action, because a minimum pressure of 25 pounds is necessary to start compression of these springs.

I desire it to be understood that I do not claim the particular form of clutch disclosed, but What I do claim are the improvements above described and set forth in the appended claims:

1. A multiple disk clutch comprising a driving member and a driven member, a series of disks mounted on the driving member, a second series of disks concentric with and alternately arranged with the disks of the first series and mounted on the driven member, the disks of one of said series having a plurality of hemispherical projections extending from each side of each disk, a casing inclosing said members and said disks and means for causing the disks to frictionally engage each other.

2. A multiple disk clutch comprising a driving member, a driven member, a series of plain disks mounted to rotate with the driving member, a series of disks provided with a plurality of projections and recesses on each side of each disk mounted to rotate with the driven member and alternately arranged with the disks of the driving member, a casing inclosing said members and said disks and means effecting the engagement and disengagement of the disks.

3. A friction disk clutch comprising a driving member, a driven member, a series of driving disks mounted on the driving member, a series of driven disks mounted on the driven member and provided with a plurality of hemispherical projections, means for causing the disks of one series to engage the disks of the other series, said means comprising auxiliary springs and main springs, the auxiliary springs being interposed between the disks and the main springs, and a casing inclosing said members, said disks and said springs.

4. In a friction clutch, the combination of a series of smooth disks, a series of disks having hemispherical projections extending from each side of each disk, the disks of one series being alternately arranged with the disks of the other series, a plurality of main springs, means adapted to control the main springs, a plurality of auxiliary springs located between the main springs and the disks, adapted to enable said main springs to press said disks together gradually when said means are operated, and to permit said main springs to frictionally lock said disks together after the auxiliary springs have reached the limit of their action, and a casing inclosing said disks and said springs.

5. A clutch comprising a series of thin metal driving disks and a series of thin metal driven disks, the metal of the disks of one of said series being distorted to form a plurality of oppositely disposed recesses and projections, the disks of each series being alternately arranged with one another and the undistorted disks contacting with the projections of the distorted disks, means for causing the driven disks to be brought into driving engagement with the driving disks, and a casing inclosing said disks.

6. A clutch comprising a driving member, a driven member, a series of disks mounted on the driving member, a second series of disks mounted on the driven member, the disks of one of said series having a plurality of projections stamped from the faces thereof and alternately arranged with the disks of the other series, an oil tight casing inclosing said members and said disks and means for causing the disks to engage and disengage.

7. A clutch comprising a driving member, a driven member, a series of disks mounted on the driving member, a second series of disks mounted on the driven member, the disks of one of said series having a plurality of projections extending from the faces thereof and alternating with the disks of the other series, and means for causing the frictional engagement of the disks, said means consisting of a set of main springs and a set of auxiliary springs located between the disks and the main springs.

8. A clutch comprising a driving member and a driven member, a series of disks mounted on the driving member, a second series of disks mounted on the driven member and alternating with the disks on the driving member, the disks of one of said series being roughened to form a series of oppositely disposed projections and recesses, and means for causing the disks to engage and disengage.

In testimony whereof, I have hereunto subscribed my name this 6th day of January, 1914.

OTTO MILLER.

Witnesses:
BERTHA R. KROPF,
W. THORNTON BOGERT.